(No Model.)

O. CATE.
SPOOL.

No. 366,073. Patented July 5, 1887.

Witnesses
Norton Folsom
Geo. E. Dent

Inventor
Octavius Cate
by his Att'ys
Brown Bros.

N. PETERS. Photo-Lithographer, Washington, D. C.

UNITED STATES PATENT OFFICE.

OCTAVIUS CATE, OF BOSTON, MASSACHUSETTS.

SPOOL.

SPECIFICATION forming part of Letters Patent No. 366,073, dated July 5, 1887.

Application filed December 13, 1886. Serial No. 221,433. (No model.)

*To all whom it may concern:*

Be it known that I, OCTAVIUS CATE, of the city of Boston, in the county of Suffolk and State of Massachusetts, have invented certain new and useful Improvements in Thread-Severing Attachments for Spools, of which the following is a full, clear, and exact description.

The object of this invention is to provide a convenient attachment for spools containing sewing-thread for severing the thread wound thereon, as may be desired from time to time.

The attachment of this invention consists of an arm of metal—sheet or plate—of hook shape at one end and suitably adapted at the other to be fastened to the head of the spool, which is suitably recessed to receive it, and on its edge or periphery notched to make a throat for the insertion of a length of the thread which is wound upon the spool, and for the thread so inserted to be then brought into contact with and across the edge of the attachment which is at said throat, and thereby severed, all substantially as hereinafter described.

Figure 1:
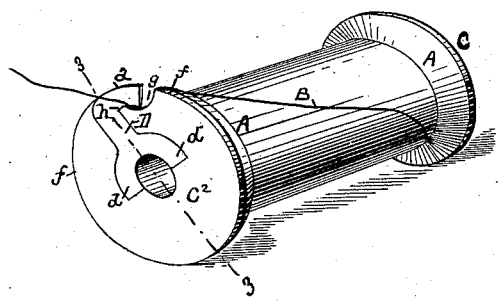
Figure 2:
Figure 3:
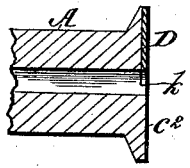

In the drawings forming a part of this specification, Figure 1 is a perspective view of a spool having the thread-severing attachment of this invention. Fig. 2 is a perspective view of the attachment detached; and Fig. 3 is a cross-section on line 3 3, Fig. 1, of the head of the spool which has the attachment applied to it.

A is a spool, and B is the thread wound upon it, and C C² are its two heads, and D is the severing attachment. This attachment D consists of an arm made of plate or sheet metal, of hook shape at its end $a$ and with prongs $b$ at its opposite end, $d$. The spool-head C² is recessed, as at $k$, Fig. 3, to receive the attachment D and to have it flush, or practically so, with such head, and the hook end $a$ of the attachment follows substantially the curve of the edge $f$ of the spool-head, which edge is cut out or notched, forming a throat, $g$, leading to the hook end $a$ for the ready insertion of a length of the thread to be brought into contact with and across the edge $h$ of the attachment D, to be thereby severed, all as is plain without further description.

I am aware attachments to spool-heads for use to sever the thread wound upon the spool are not new, and I do not claim such of themselves or in combination with a spool; but, What I do claim, and desire to secure by Letters Patent, is—

A spool, A, having a notch or throat, $g$, in the edge $f$, and a recess, $k$, in one of its heads, C², in combination with a severing attachment, D, composed of a metal arm setting in said recess $k$ and attached to spool-head C², and having a hook-shaped end, $a$, with an edge, $n$, at said throat $g$ of said spool-head, substantially as described, for the purpose specified.

In testimony whereof I have hereunto set my hand in the presence of two subscribing witnesses.

OCTAVIUS CATE.

Witnesses:
ALBERT W. BROWN,
FRANCES M. BROWN.